United States Patent
Borza et al.

(10) Patent No.: US 7,044,261 B2
(45) Date of Patent: May 16, 2006

(54) POWER STEERING MOTOR HAVING A NOISE DAMPENING PISTON ASSEMBLY

(75) Inventors: John S. Borza, Shelby Township, MI (US); William F. Olsen, Birmingham, MI (US); Richard A. Stoll, Royal Oak, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 256 days.

(21) Appl. No.: 10/406,399

(22) Filed: Apr. 3, 2003

(65) Prior Publication Data

US 2004/0195036 A1    Oct. 7, 2004

(51) Int. Cl.
B62D 5/16    (2006.01)

(52) U.S. Cl. ...................... 180/417; 180/430

(58) Field of Classification Search ................ 180/417, 180/426, 427, 428, 434, 430; 92/172, 176, 92/181 R, 250, 181 P, 253
See application file for complete search history.

(56) References Cited

U.S. PATENT DOCUMENTS

| | | | | |
|---|---|---|---|---|
| 4,123,965 A | * | 11/1978 | Brown et al. | 92/136 |
| 4,316,519 A | * | 2/1982 | Taig | 180/428 |
| 4,351,228 A | * | 9/1982 | Schultz et al. | 92/128 |
| 4,653,339 A | * | 3/1987 | Komatsu et al. | 74/422 |
| 4,828,068 A | * | 5/1989 | Wendler et al. | 180/428 |
| 5,213,175 A | * | 5/1993 | Feindel | 180/428 |
| 6,363,833 B1 | * | 4/2002 | Stoll | 92/136 |
| 2002/0139207 A1 | * | 10/2002 | Stoll et al. | 74/422 |
| 2002/0189890 A1 | * | 12/2002 | Martin | 180/428 |

* cited by examiner

Primary Examiner—Lesley D. Morris
Assistant Examiner—Daniel Yeagley
(74) Attorney, Agent, or Firm—Tarolli, Sundheim, Covell & Tummino L.L.P.

(57) ABSTRACT

An apparatus (10) for turning steerable wheels of a vehicle comprises a housing (14) that defines a fluid chamber (24). A rack bar (26) extends longitudinally through the housing (14) and is connectable with the steerable wheels of the vehicle. The rack bar (26) is movable relative to the housing (14) for turning the steerable wheels. A piston assembly (34) is fixedly attached to the rack bar (26) and sealingly engages the housing (14). The piston assembly (34) divides the fluid chamber (24) into first and second chamber portions (40 and 42). A fluid source (80) directs fluid toward one of the first and second chamber portions (40 or 42) for creating a differential pressure between the first and second chamber portions (40 and 42). The piston assembly (34) and the rack bar (26) move relative to the housing (14) in response to the differential pressure. The piston assembly (34) includes structure (132) for dampening fluid pulsations emanating from the fluid source (80).

10 Claims, 4 Drawing Sheets

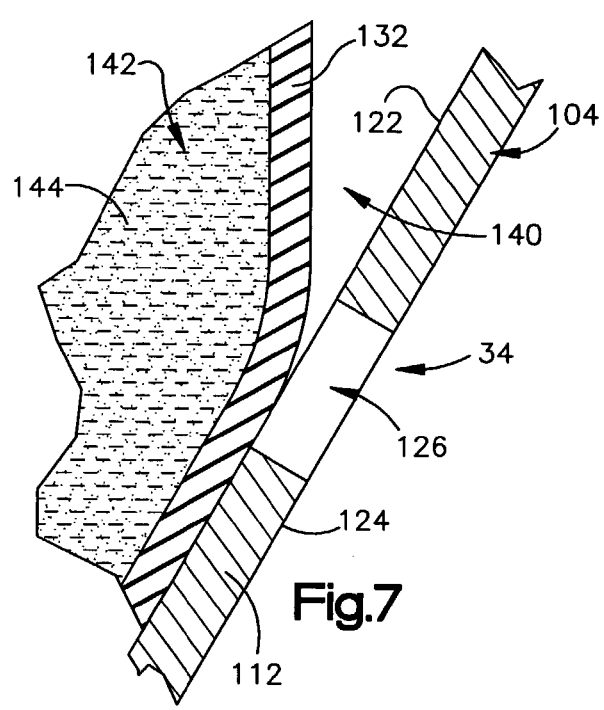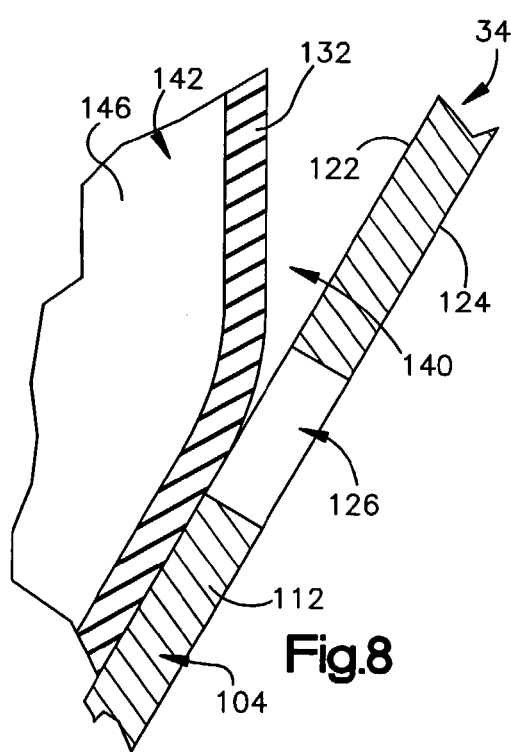

POWER STEERING MOTOR HAVING A NOISE DAMPENING PISTON ASSEMBLY

TECHNICAL FIELD

The present invention relates to a power steering motor. More particularly, the present invention relates to a hydraulically powered, power steering motor for a rack and pinion steering gear.

BACKGROUND OF THE INVENTION

A known hydraulic power steering motor for a rack and pinion steering gear includes a housing. A rack bar extends through the housing. A piston is fixedly attached to the rack bar and divides the housing into first and second fluid chambers.

A fluid source provides fluid to the hydraulic power steering motor. The fluid source includes a reservoir, a fluid pump, a control valve, and a plurality of conduits. The pump pumps fluid from the reservoir to the control valve. A first conduit connects the pump and an inlet of the control valve. A second conduit connects an outlet of the control valve to the reservoir for returning fluid to the reservoir. Third and fourth conduits connect the control valve to the first and second chambers, respectively, of the power steering motor. If the control valve directs fluid toward the first chamber, the fluid pressure within the first chamber increases relative to the fluid pressure of the second chamber. If the control valve directs fluid toward the second chamber, the fluid pressure within the second chamber increases relative to the fluid pressure of the first chamber.

The fluid pressure in the first chamber and the fluid pressure in the second chamber act on the piston. When a sufficient differential pressure arises between the first and second chambers, the piston and the rack bar move relative to the housing for turning the steerable wheels of the vehicle.

The pump is typically a positive displacement pump. As a result, pulsations or pressure fluctuations arise in the fluid provided by the pump. Pulsations may also arise in response to manipulation of the control valve, such as during a steering maneuver. The pulsations may act on the piston of the power steering motor and may result in a driver perceptible noise or shudder in the power steering motor.

SUMMARY OF THE INVENTION

The present invention relates to an apparatus for turning steerable wheels of a vehicle. The apparatus comprises a housing that defines a fluid chamber. A rack bar extends longitudinally through the housing and is connectable with the steerable wheels of the vehicle. The rack bar is movable relative to the housing for turning the steerable wheels. A piston assembly is fixedly attached to the rack bar and sealingly engages the housing. The piston assembly divides the fluid chamber into first and second chamber portions. A fluid source directs fluid toward one of the first and second chamber portions for creating a differential pressure between the first and second chamber portions. The piston assembly and the rack bar move relative to the housing in response to the differential pressure. The piston assembly includes structure for dampening fluid pulsations emanating from the fluid source.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 7 illustrates a portion of the piston assembly of a second embodiment of the present invention; and FIG. 8 illustrates a portion of the piston assembly of a third embodiment of the present invention.

DETAILED DESCRIPTION OF THE INVENTION

Figure 1:
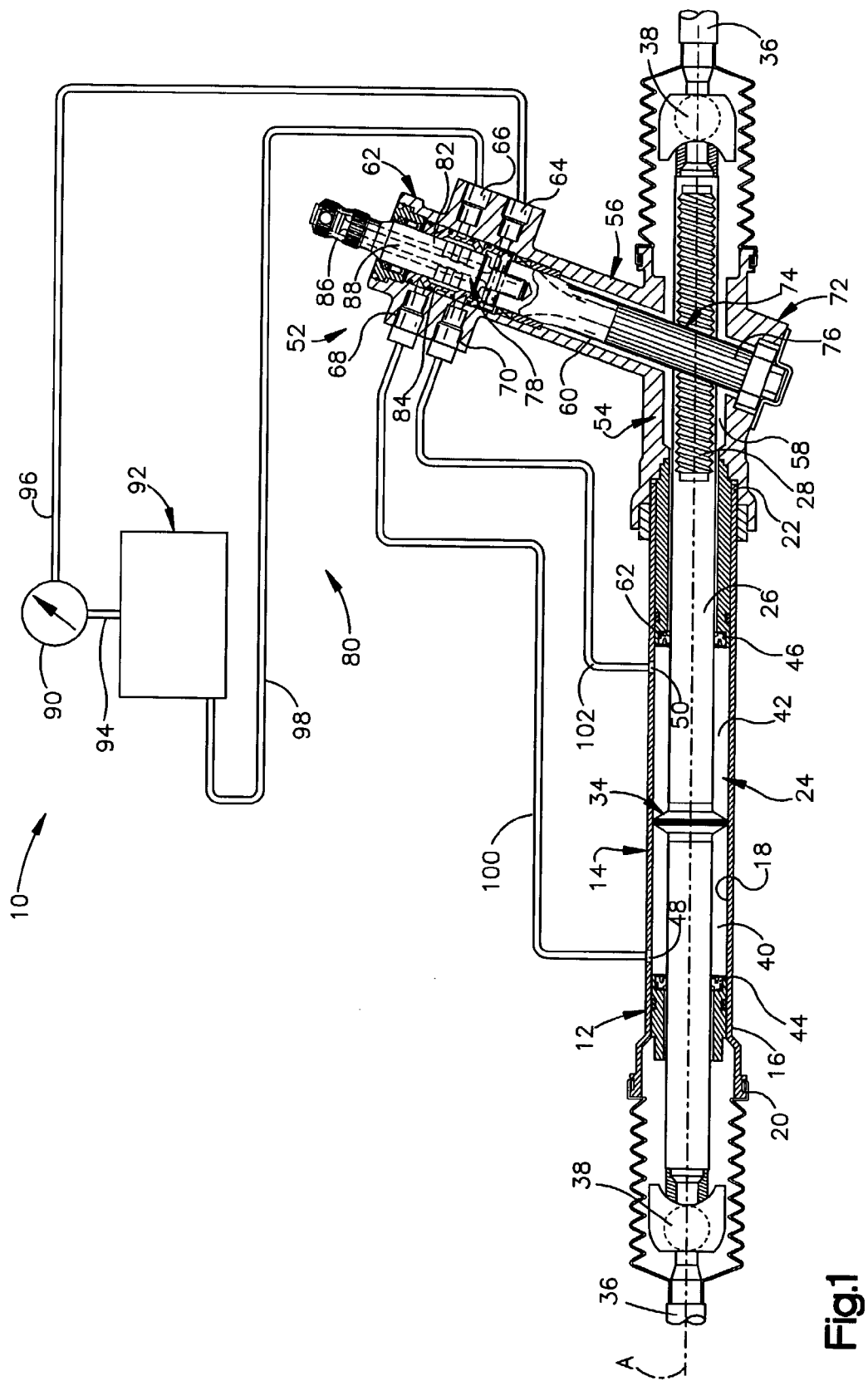
FIG. 1 is a schematic sectional view of an apparatus constructed in accordance with the present invention.

FIG. 1 illustrates an exemplary embodiment of an apparatus 10 constructed in accordance with the present invention. The apparatus 10 illustrated in FIG. 1 is a rack and pinion steering system.

The rack and pinion steering system 10 includes a power steering motor 12. The power steering motor 12 includes a cylindrical housing 14 with an exterior surface 16 and an interior surface 18. The power steering housing 14 has a longitudinal length defined between an end 20 and an end 22. The interior surface 18 of the power steering motor housing 14 defines a cylindrical chamber 24. The chamber 24 is centered on a longitudinally extending axis A.

Figure 2:
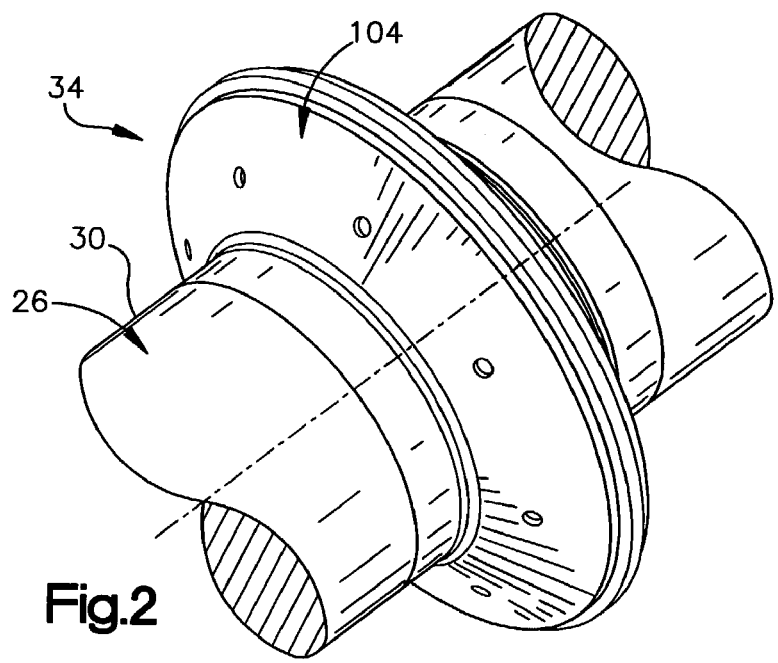
FIG. 2 is a perspective, partial cutaway view of a rack bar and a piston assembly of the apparatus of FIG. 1.

A rack bar 26 extends longitudinally through the chamber 24 of the power steering motor housing 14. The rack bar 26 has a longitudinal length that is greater than the longitudinal length of the power steering housing 14. A portion of the rack bar 26 located longitudinally outside of end 22 of the power steering motor housing 14 includes a plurality of rack teeth 28. A portion of the rack bar 26 extending through the housing 14 has a generally cylindrical outer surface 30 (FIG. 2). An annular recess 32, best shown in FIG. 3, extends into the outer surface 30 of the rack bar 26 for receiving a piston assembly 34.

The rack bar 26 is connectable to steerable wheels (not shown) of a vehicle through tie rods 36. Ball joints 38 connect the tie rods 36 to the ends of the rack bar 26. Movement of the rack bar 26 relative to the housing 14 along axis A results in turning the steerable wheels of the vehicle.

The piston assembly 34 is fixedly connected to the rack bar 26. A portion of the piston assembly 34 is received in the annular recess 32 of the rack bar 26. Details of the piston assembly 34 will be discussed below with reference to FIGS. 2–6. The piston assembly 34 sealingly engages the interior surface 18 of the housing 14 and divides the chamber 24 into two variable volume chamber portions 40 and 42. The volume of each chamber portion 40 and 42 varies as the piston assembly 34 and the rack bar 26 move relative to the housing 14 of the power steering motor 12.

The power steering motor 12 also includes at least two seals 44 and 46. Seal 44 is fixed relative to the housing 14 adjacent end 20. Seal 44 extends between the interior surface 18 of the housing 14 and the outer surface 30 of the rack bar 26 and defines an outer wall of chamber portion 40. Seal 46 is fixed relative to the housing 14 adjacent end 22. Seal 46 extends between the interior surface 18 of the housing 14 and the outer surface 30 of the rack bar 26 and defines an outer wall of chamber portion 42. Seals 44 and 46 prevent fluid from leaking from chamber portions 40 and 42, respectively, as the rack bar 26 moves relative to the housing 14.

The power steering motor housing 14 further includes two ports 48 and 50. Port 48 extends from the exterior surface 16 of the housing 14 to the interior surface 18 of the housing 14 to provide fluid communication with chamber portion 40. Port 50 extends from the exterior surface 16 of the housing 14 to the interior surface 18 of the housing 14 to provide fluid communication with chamber portion 42.

The rack and pinion steering system 10 also includes a steering gear housing 52. The steering gear housing 52 includes a rack portion 54 and a pinion portion 56. The rack portion 54 is fixedly connected to the power steering motor housing 14 and includes a rack bar channel 58 that is centered on axis A. The portion of the rack bar 26 having rack teeth 28 extends through the rack channel 58 of the rack portion 54 of the steering gear housing 52. It is noted that the power steering motor housing 14 and the steering gear housing 52 may be integrally formed as a single housing with a single longitudinal channel forming both rack portion 54 of the steering gear housing 52 and the power steering motor housing 14.

The pinion portion 56 of the steering gear housing 52 is angled relative to the rack portion 54. A channel 60 extends through the pinion portion 56. A proximal end 62 of the pinion portion 56 of the steering gear housing 52 includes four ports 64, 66, 68, and 70 that extend from an outer surface of the pinion portion 56 to the channel 60. The four ports include an inlet port 64, an outlet port 66, and two power steering motor ports 68 and 70. The channel 60 of the pinion portion 56 of the steering gear housing 52 partially intersects the rack bar channel 58 near a distal end 72 of the pinion portion 56 of the steering gear housing 52.

A pinion gear 74 is located in the channel 60 of the pinion portion 56 of the steering gear housing 52. The pinion gear 74 is located in the portion of the channel 60 that partially intersects the rack bar channel 58. The pinion gear 74 includes a plurality of teeth 76 for meshingly engaging the rack teeth 28 of the rack bar 26.

A control valve 78 is located in the channel 60 of the pinion portion 56 of the steering gear housing 52 adjacent the four ports 64–70. The control valve 78 forms a portion of a fluid source 80. The control valve 78 directs fluid toward one chamber portion 40 or 42 of the power steering motor 12 for causing movement of the rack bar 26 relative to the housing 14 to turn the steerable wheels of the vehicle. The control valve 78 includes a valve core 82 and a valve sleeve 84. The valve core 82 and the valve sleeve 84 are both located within the pinion portion 56 of the steering gear housing 52. The valve core 82 of the control valve 78 is fixedly connected to an input shaft 86. The valve sleeve 84 is fixedly connected to the pinion gear 74. A torsion bar 88 connects the input shaft 86 and the pinion gear 74 and enables the valve core 82 to be rotated relative to the valve sleeve 84.

The fluid source 80 of the rack and pinion steering system 10 also includes a pump 90, a reservoir 92, and conduits 94–102. The pump 90 is supplied with fluid from the reservoir 92 via conduit 94. Conduit 96 provides fluid communication between an outlet of the pump 90 and the inlet port 64 in the pinion portion 56 of the steering gear housing 52. The inlet port 64 is in fluid communication with an inlet to the control valve 78. Conduit 98 provides fluid communication between the outlet port 66 in the pinion portion 56 of the steering gear housing 52 and the reservoir 90. The outlet port 66 is in fluid communication with an outlet to the control valve 78.

Conduit 100 provides fluid communication between chamber portion 40 and the control valve 78 via ports 48 and 68. Conduit 102 provides fluid communication between chamber portion 42 and the control valve 78 via ports 50 and 70.

A steering wheel (not shown) is associated with a proximal end of the input shaft 86. When the torsion bar 88 twists during rotation of the steering wheel, the valve core 82 of the control valve 78 is rotated relative to the valve sleeve 84 of the control valve 78, and fluid is directed toward one chamber portion 40 or 42 of the power steering motor 12. In response to rotation of the valve core 82 relative to the valve sleeve 84, a differential pressure arises between the two chamber portions 40 and 42 of the power steering motor 12. Specifically, the fluid pressure increases in the chamber portion 40 or 42 toward which the control valve 78 directs fluid flow. The piston assembly 34 and the rack bar 26 move longitudinally relative to the housing 14 in response to the differential pressure between the two chamber portions 40 and 42. This movement of the rack bar 26 causes turning of the steerable wheels of the vehicle.

The piston assembly 34 and the rack bar 26 move relative to the housing 14 until the pressure in the respective chamber portions 40 and 42 equalizes. For example, assuming that chamber portion 40 has a fluid pressure that is greater than the fluid pressure in chamber portion 42, the higher pressure of the chamber portion 40 acts on the piston assembly 34 and causes the piston assembly 34 and the rack bar 26 to move to the right, as shown in FIG. 1. The piston assembly 34 and the rack bar 26 move rightward until the differential pressure between the two chamber portions 40 and 42 is eliminated. As the piston assembly 34 moves rightward, the volume of chamber portion 42 decreases. As the volume of chamber portion 42 decreases, a portion of the hydraulic fluid within chamber portion 42 is forced out of chamber portion 42. The hydraulic fluid forced out of the decreasing volume chamber portion 42 returns to the control valve 78 through conduit 102. The control valve 78 directs the fluid to conduit 98, which directs the fluid to reservoir 92.

Movement of the rack bar 26 in response to the differential pressure causes rotation of the pinion gear 74 in a direction to remove the twisting from the torsion bar 88. Since the valve sleeve 84 is fixedly connected to the pinion gear 74, the valve sleeve 84 of the control valve 78 is rotated in response to the rotation of the pinion gear 74. When the fluid pressure in chamber portions 40 and 42 equalize, the control valve 78 is actuated to a neutral condition. As long as the control valve 78 is in the neutral condition, the fluid pressure in chamber portions 40 and 42 remains equal.

Figure 3:
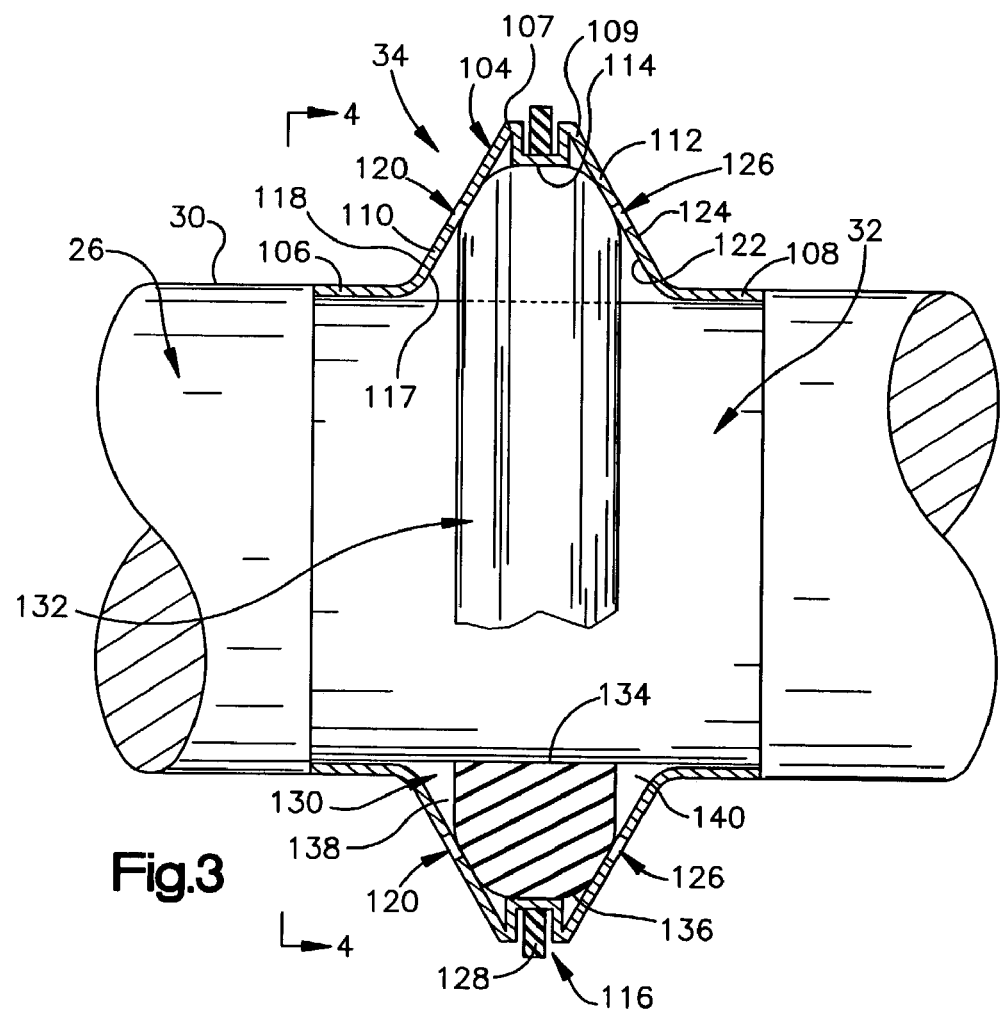
FIG. 3 is a longitudinal cutaway view of the rack bar and the piston assembly of FIG. 2.
Figure 4:
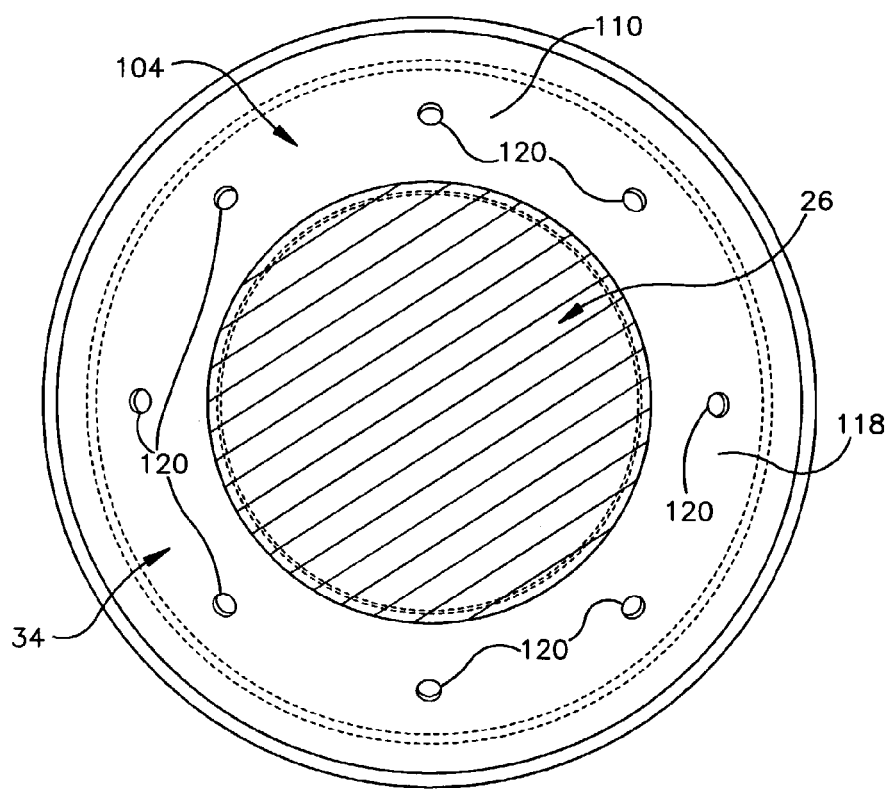
FIG. 4 is a view taken along line 4—4 in FIG. 3.

The piston assembly 34 is illustrated in FIGS. 2–4. The piston assembly 34 includes an annular shell 104. In one embodiment, the shell 104 is stamped out of sheet metal. Longitudinally opposite ends of the shell include annular flanges 106 and 108 (FIG. 3). Each of the annular flanges 106 and 108 has an inner diameter that is sized to fit within the annular recess 32 of the rack bar 26.

The shell 104 also includes two angled sidewalls 110 and 112. Sidewall 110 extends radially outwardly from flange 106 and is angled relative to flange 106 by an obtuse angle. A radially outward end 107 (FIG. 3) of sidewall 110 is located between flanges 106 and 108. Sidewall 112 extends radially outwardly from flange 108 and is angled relative to flange 108 by an obtuse angle. A radially outward end 109 (FIG. 3) of sidewall 112 is located between flanges 106 and 108. An annular ring 114 (FIG. 3), which forms an annular groove 116, connects the radially outward ends 107 and 109 of sidewalls 110 and 112.

Sidewall 110 includes an inner surface 117 (FIG. 3) and an outer surface 118 (FIG. 4). A plurality of circular openings 120, eight of which are shown in FIG. 4, extend through sidewall 110 from the inner surface 117 to the outer surface 118.

Sidewall 112 also includes an inner surface 122 (FIG. 5) and an outer surface 124. A plurality of circular openings 126 extends through sidewall 112 from the inner surface 122 to the outer surface 124. Preferably, sidewall 112 includes the same number of openings 126 as the number of openings 120 in sidewall 110. Preferably, each circular opening 120 has the same diameter as each other circular opening 120. Also preferably, each circular opening 126 has the same diameter as each other circular opening 126 and each circular opening 120.

Preferably, the rack bar 26 has an outer diameter in the range of 22 to 32 millimeters. The piston assembly 34 has an outer diameter in the range of 42 to 45 millimeters. The diameter of each opening 120 and 126 in sidewalls 110 and 112, respectively, is in the range of 2–5 millimeters. These dimensions are preferred dimensions and are not meant to limit the scope of the present invention in any way.

The shell 104 of the piston assembly 34 is fixedly attached within the annular recess 32 of the rack bar 26. Swedging, crimping, magna forming, or any other known method may be used to fixedly attach the flanges 106 and 108 of the shell 104 to the rack bar 26.

A sealing ring 128 (FIG. 3) of the piston assembly 34 is placed in the annular groove 116 of the shell 104 of the piston assembly 34. The sealing ring 128, which may be an O-ring, is seated in the annular groove 116 and extends radially outwardly of the sidewalls 110 and 112. An outer diameter of the sealing ring 128 sealingly engages the interior surface 18 of the power steering motor housing 14 to prevent fluid communication between chamber portions 40 and 42.

An internal cavity 130 (FIG. 3) is defined between the sidewalls 110 and 112 of the piston assembly 34. The outer surface of the annular recess 32 of the rack bar 26, when the shell 104 of the piston assembly 34 is secured to the rack bar 26, defines a radially inner surface of the internal cavity 130. The openings 120 in sidewall 110 provide fluid communication between chamber portion 40 and the internal cavity 130. The openings 126 in sidewall 112 provide fluid communication between chamber portion 42 and the internal cavity 130.

The piston assembly 34 also includes a dampening ring 132 (FIG. 3). In the embodiment illustrated in FIGS. 2–6, the dampening ring 132 is formed from a solid, compressible elastomeric material that is chemically compatible with the hydraulic fluid. The dampening ring 132 is annular and includes a cylindrical inner surface 134 that defines an inner diameter and an arcuate outer surface 136, a peak of which defines an outer diameter. The inner diameter of the dampening ring 132 is sized to sealingly engage the outer surface of the annular recess 32 of the rack bar 26. The outer diameter of the dampening ring 132 is sized to sealingly engage the annular ring 114 of the shell 104 of the piston assembly 34. As a result, the dampening ring 132 prevents fluid communication between chamber portions 40 and 42.

The dampening ring 132 is placed in the shell 104 prior to attachment of the shell 104 to the rack bar 26. When the shell 104 is attached to the rack bar 26, the dampening ring 132 is compressed slightly to form a tight seal to the rack bar 26 and to the shell 104.

The dampening ring 132 divides the internal cavity 130 into portions 138 and 140 (FIG. 3). Portion 138 is associated with chamber portion 40 and is in fluid communication with chamber portion 40 via openings 120. Portion 140 is associated with chamber portion 42 and is in fluid communication with chamber portion 42 via openings 126.

Figures 5, 6:
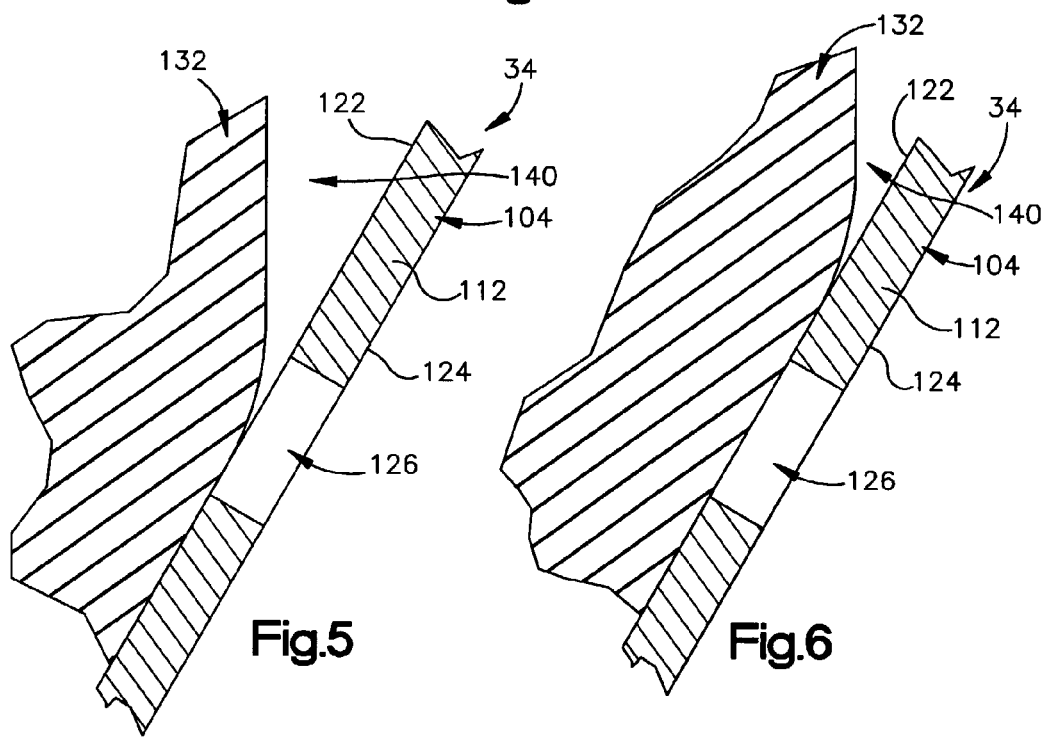
FIG. 5 is an enlarged view of a portion of the piston assembly of FIG. 3.
FIG. 6 illustrates the portion of FIG. 5 when subjected to a differential pressure.

FIG. 5 illustrates an enlarged view of an opening 126 that provides fluid communication between portion 140 and chamber portion 42 when no differential pressure exists between chamber portions 40 and 42. As FIG. 5 illustrates, the dampening ring 132 is removed from the openings 126 of sidewall 112 to allow fluid flow between portion 140 and chamber portion 42.

During operation of the rack and pinion steering system 10 illustrated in FIG. 1, the dampening ring 132 of the piston assembly 34 dampens pulsations in the fluid supplied from the fluid source 80. For example, assuming a steering maneuver is made such that the control valve 78 directs fluid into conduit 100 and toward chamber portion 40. A differential pressure arises between chamber portions 40 and 42, with chamber portion 40 having a higher fluid pressure than chamber portion 42. Since the fluid from the fluid source 80 is directed toward chamber portion 40, chamber portion 40 is subjected to the pulsations.

When the differential pressure arises between chamber portions 40 and 42, the same differential pressure arises between portions 138 and 140 of the internal cavity 130. The differential pressure moves the dampening ring 132 relative to the shell 104. With reference to FIG. 3, the dampening ring 132 moves rightward when the fluid pressure in portion 138 is greater than the fluid pressure in portion 140. The movement of the dampening ring 132 rightward results in the arcuate outer surface 136 of the dampening ring 132 closing the openings 126 in sidewall 112 of the shell 104, as shown in FIG. 6. After the dampening ring 132 contacts sidewall 112, a further increase in the differential pressure between portions results in compression of the dampening ring 132.

The rightward movement of the dampening ring 132 also increases the volume of portion 138. The fluid in portion 138 is subjected to the pulsations from the fluid source 80. The dampening ring 132 compresses to dampen the pulsations. As a result, piston assembly 34 reduces the probability of noise caused by the pulsations of the fluid source 80. The hardness or compressibility of the dampening ring 132 may be adjusted to vary the dampening provided by the piston assembly 34 of the present invention.

FIGS. 7–8 illustrate second and third embodiments, respectively, of the present invention. The same reference numbers are used to indicate the same or similar structure. In each of the embodiments of FIGS. 7–8, only the structure of the dampening ring 132 is changed as compared to the rack and pinion steering system 10 of FIGS. 1–6.

The dampening ring 132 of FIG. 7 is an annular bladder having an annular internal cavity 142. The annular internal cavity 142 of the dampening ring 132 in FIG. 7 is filled with a liquid 144, such as a gel. Bladder 132 is preferable formed from rubber and the liquid 144 is chosen to provide a desired compressibility for the dampening ring 132.

The dampening ring 132 of FIG. 8 is also an annular bladder having an annular internal cavity 142. The annular internal cavity 142 of the dampening ring 132 of FIG. 8 is filled with a gas 146, such as air. The bladder 132 is preferably formed from rubber and the pressure of the gas 146 within the cavity 142 is chosen to provide a desired compressibility for the dampening ring 132.

From the above description of the invention, those skilled in the art will perceive improvements, changes and modifications. For example, the openings 120 and 126 in the piston assembly 34 may have a shape other than circular. Such improvements, changes and modifications within the skill of the art are intended to be covered by the appended claims.

The invention claimed is:

1. An apparatus for turning steerable wheels of a vehicle, the apparatus comprising:
   a housing defining a fluid chamber;
   a rack bar extending longitudinally through the housing and being connectable with the steerable wheels of the vehicle, the rack bar being movable relative to the housing for moving the steerable wheels;
   a piston assembly fixedly attached to the rack bar and sealingly engaging the housing, the piston assembly dividing the fluid chamber into first and second chamber portions; and
   a fluid source for directing fluid toward one of the first and second chamber portions for creating a differential pressure between the first and second chamber portions, the piston assembly and the rack bar moving relative to the housing in response to the differential pressure,
   the piston assembly including a fluid seal sealingly engaging said housing, a chamber exposed to fluid in said first and second chamber portions, and structure for dampening fluid pulsations emanating from the fluid source.

2. The apparatus of claim 1 wherein the structure of the piston assembly includes a compressible member.

3. The apparatus of claim 2 wherein the compressible member is annular and is formed from an elastomeric material.

4. The apparatus of claim 1 wherein said structure for dampening fluid pulsations is spaced from said housing.

5. An apparatus for turning steerable wheels of a vehicle, the apparatus comprising:
   a housing defining a fluid chamber;
   a rack bar extending longitudinally through the housing and being connectable with the steerable wheels of the vehicle, the rack bar being movable relative to the housing for moving the steerable wheels;
   a piston assembly fixedly attached to the rack bar and sealingly engaging the housing, the piston assembly dividing the fluid chamber into first and second chamber portions; and
   a fluid source for directing fluid toward one of the first and second chamber portions for creating a differential pressure between the first and second chamber portions, the piston assembly and the rack bar moving relative to the housing in response to the differential pressure,
   the piston assembly including structure for dampening fluid pulsations emanating from the fluid source, the structure of the piston assembly including a compressible member, wherein the piston assembly includes a shell that defines an internal cavity, the compressible member being located within the internal cavity of the shell.

6. The apparatus of claim 5 wherein the shell is fixedly attached to the rack bar and wherein the compressible member includes an inner surface for sealingly engaging the rack bar and an outer surface for sealingly engaging a portion of the shell.

7. The apparatus of claim 6 wherein the shell includes first and second sidewalls, a first plurality of openings extending through the first sidewall, and a second plurality of openings extending through the second sidewall.

8. The apparatus of claim 7 wherein the compressible member divides the internal cavity of the shell into first and second portions, the first plurality of openings providing fluid communication between the first chamber portion and the first portion of the internal cavity, the second plurality of openings providing fluid communication between the second chamber portion and the second portion of the internal cavity.

9. An apparatus for turning steerable wheels of a vehicle, the apparatus comprising:
   a housing defining a fluid chamber;
   a rack bar extending longitudinally through the housing and being connectable with the steerable wheels of the vehicle, the rack bar being movable relative to the housing for moving the steerable wheels;
   a piston assembly fixedly attached to the rack bar and sealingly engaging the housing, the piston assembly dividing the fluid chamber into first and second chamber portions; and
   a fluid source for directing fluid toward one of the first and second chamber portions for creating a differential pressure between the first and second chamber portions, the piston assembly and the rack bar moving relative to the housing in response to the differential pressure,
   the piston assembly including structure for dampening fluid pulsations emanating from the fluid source, wherein the piston assembly including an internal cavity, a first plurality of openings providing fluid communication between the first chamber portion and the internal cavity, a second plurality of opening providing fluid communication between the second chamber portion and the internal cavity, and a dampening ring located within the internal cavity for preventing fluid communication between the first and second chamber portions, the dampening ring being movable within the internal cavity for dampening pulsations of the fluid source.

10. An apparatus for turning steerable wheels of a vehicle, the apparatus comprising:
    a housing defining a fluid chamber;
    a rack bar extending longitudinally through the housing and being connectable with the steerable wheels of the vehicle, the rack bar being movable relative to the housing for moving the steerable wheels;
    a piston assembly fixedly attached to the rack bar and sealingly engaging the housing, the piston assembly dividing the fluid chamber into first and second chamber portions; and
    a fluid source for directing fluid toward one of the first and second chamber portions for creating a differential pressure between the first and second chamber portions, the piston assembly and the rack bar moving relative to the housing in response to the differential pressure,
    the piston assembly including structure for dampening fluid pulsations emanating from the fluid source, the structure of the piston assembly including a compressible member, wherein the compressible member is an annular bladder, the annular bladder having an internal cavity, a dampening fluid being located in the internal cavity.

* * * * *